United States Patent [19]

Harris et al.

[11] Patent Number: 4,669,755
[45] Date of Patent: Jun. 2, 1987

[54] HOSE CONNECTION FOR VACUUM CLEANER ATTACHMENTS

[75] Inventors: Frank R. Harris, Anderson; Marsha J. Cartee, Greenville, both of S.C.

[73] Assignee: The Singer Company, Stamford, Conn.

[21] Appl. No.: 912,746

[22] Filed: Sep. 29, 1986

[51] Int. Cl.⁴ ............................................. F16L 37/12
[52] U.S. Cl. ......................................... 285/7; 285/12; 285/319; 285/320; 285/921
[58] Field of Search ............... 285/7, 12, 320, 921, 285/319

[56] References Cited

U.S. PATENT DOCUMENTS

| | | | |
|---|---|---|---|
| 2,184,881 | 12/1939 | Martinet | 285/7 |
| 3,394,954 | 7/1968 | Sarns | 285/319 |
| 3,686,896 | 8/1972 | Rutter | 285/320 X |
| 4,079,965 | 3/1978 | Moughty et al. | 285/7 |
| 4,133,312 | 1/1979 | Burd | 285/12 X |
| 4,220,360 | 9/1980 | Jacek et al. | 285/921 X |

Primary Examiner—Thomas F. Callaghan
Attorney, Agent, or Firm—David L. Davis

[57] ABSTRACT

A vacuum cleaner hose connection fitting is provided which can accommodate attachments both internally and externally thereon, and a single latch device is provided capable of securing either internally or externally accommodated attachments to the hose fitting.

6 Claims, 3 Drawing Figures

U.S. Patent    Jun. 2, 1987    4,669,755

HOSE CONNECTION FOR VACUUM CLEANER ATTACHMENTS

BACKGROUND OF THE INVENTION

1. Field of the Invention

This invention relates to hose connected vacuum cleaner attachments and, more particularly, to a novel separable connection between a vacuum cleaner hose and various cleaning attachments.

2. Description of the Prior Art

Hose connections such as that disclosed in U.S. Pat. No. 1,013,364, Jan. 2, 1912, of Behm are known in the art in which cleaning attachments are accommodated within a bore formed in a fitting carried at the free extremity of a flexible hose. Other hose connections, such as that disclosed in U.S. Pat. No. 1,016,649, Feb. 6, 1912, of Spencer are known in which cleaning attachments are formed with a fitting externally encompassing the free extremity of a bore or wand. None disclose an arrangement in which the hose or wand may accommodate attachment fittings either internally or externally; and none disclose a vacuum cleaner hose or wand having an attachment retaining latch which is operative to secure thereon interchangeably either an internally or externally accommodated attachment fitting.

OBJECTS OF THE INVENTION

Certain hose or wand supported vacuum cleaner attachments decrease the size of the air passage toward the free extremity such as is the case with crevice cleaning tools, small brushes, and the like; and with such attachments, as well as with attachments in which the maintenance of small overall size is critically important, it is advantageous for the attachment to be accommodated internally of the attachment accommodating fitting of the flexible hose leading to the vacuum cleaner. For other types of attachments, wands, and the like, where it is desirable not to diminish the size of the air passageway, it is advantageous for the attachment to be accommodated externally of the attachment accommodating fitting.

It is an object of the present invention to provide an attachment accommodating fitting on a conduit leading to a vacuum cleaner which can accommodate attachments either externally or internally; and a further object is to provide a latching device for such an attachment accommodating fitting which is capable of releasably securing to such a fitting attachments which are accommodated either internally or externally thereon.

DESCRIPTION OF THE DRAWINGS

With the above and additional objects and advantages in view, as will hereinafter appear, this invention will now be described with reference to the accompanying drawings of a preferred embodiment in which:

Referring to FIG. 1 of the accompanying drawing, 11 denotes a hand grip portion of an air hose leading to a vacuum cleaner (not shown). The cylindrical free extremity 12 of the hand grip portion of the air hose has an internal cylindrical surface 13 and an external cylindrical surface 14.

Figure 1:
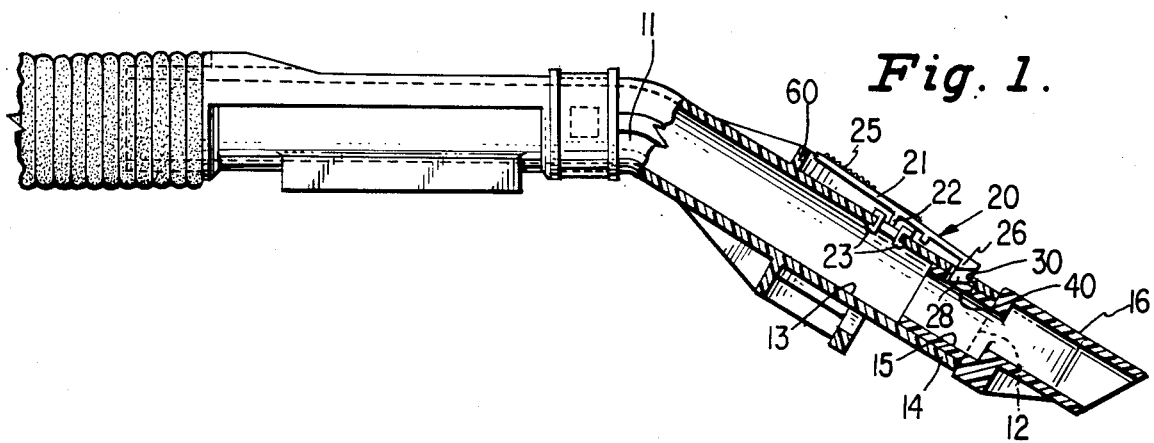
FIG. 1 is an elevational view partly in vertical cross section of a hose connection for a vacuum cleaner in accordance with this invention showing an attachment accommodated internally of the hose connection and secured in place thereon.
Figure 2:
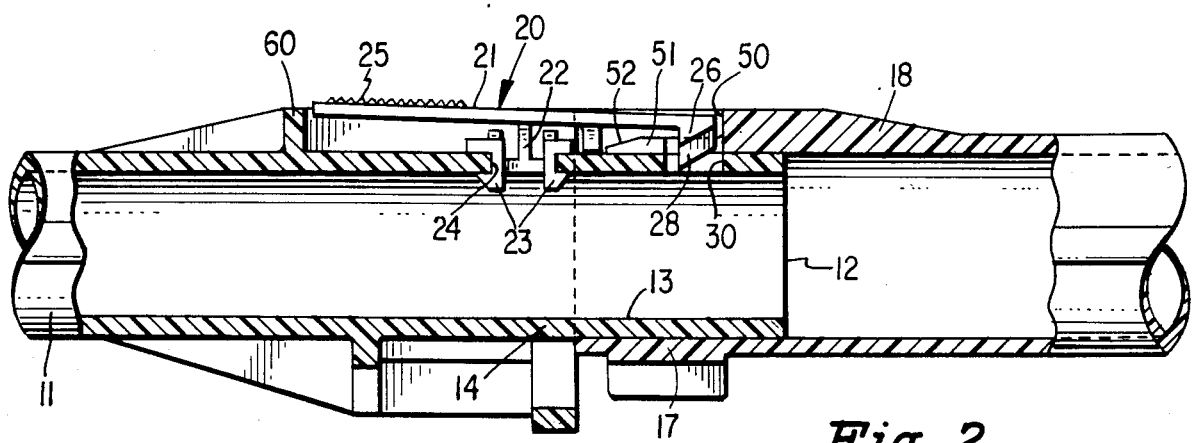
FIG. 2 is a vertical cross sectional view of the hose connection illustrated in FIG. 1, but showing an attachment accommodated externally of the hose connection and secured in place thereon.
Figure 3:
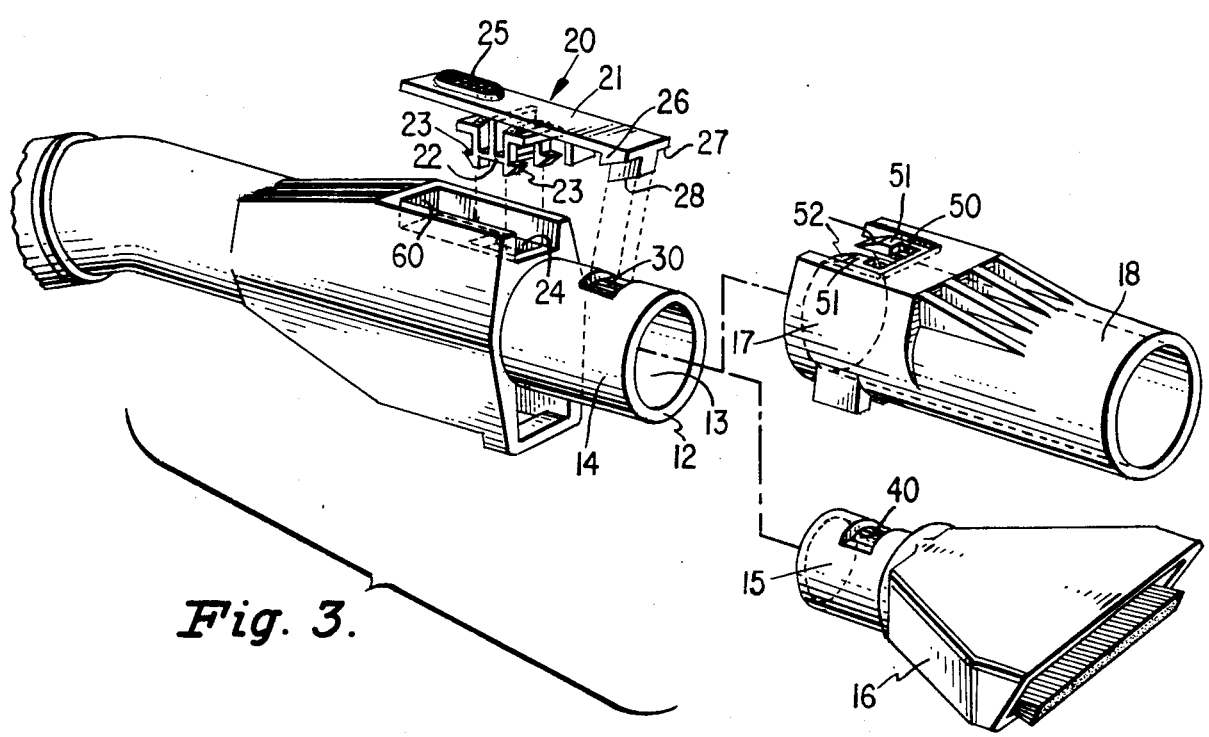
FIG. 3 is a disassembled perspective view of portions of the hose connection and latch element in accordance with this invention, together with attachments both internally and externally accommodated on the hose connection.

The free extremity 12 is thus adapted to accommodate on the internal surface 13 a small diameter cylindrical butt portion 15 of an attachment 16 as illustrated in FIGS. 1 and 3, or on the external surface 14 a large diameter cylindrical butt portion 17 of an attachment 18 as illustrated in FIGS. 2 and 3.

Moreover, this invention provides a latch device which is simple and cost effective in construction and assembly which is capable of cooperation in securely fastening to the hand grip portion of the air hose attachments accommodated either internally or externally of the hose extremity. The latch device is provided by a latch lever 20 which is preferably formed of molded resilient plastic material. The latch lever includes a flat substantially straight beam 21 formed substantially centrally with a depending support blade 22 which extends at a slight angle from perpendicularity to the beam. An angle of 3° from perpendicular has been found to provide a satisfactory at-rest relationship of the parts as will hereinafter be described.

Extending from each side of the blade 22 is a bifurcated clevis 23 adapted to be forced into embracing relationship, each clevis with an opposite edge of a rectangular support aperture 24 formed near the hose extremity 12.

When thus supported on the hose extremity, the latch lever 20, because of the angular relationship of the blade 22 to the beam 21, will position the beam 21 on an inclination to the hose extremity with one beam extremity of the latch lever which is formed with a roughened outer surface 25 tilted upwardly and the opposite beam extremity which is formed with a downwardly extending set of latch fingers 26, 27 and 28 tilted downwardly. To this end, the support blade preferably extends at the aforesaid angle of 87° from that limb of the latch lever beam carrying the latch fingers 26, 27 and 28.

The two latch fingers 26 and 27 located one at each side of the beam 21 extend only a short distance from the beam 21 while the central latch finger 28 extends further from the beam; and each of the latch fingers is formed with a sharply inclined free extremity angled upwardly toward the extremity of the beam 21.

A latch aperture 30 is formed in the hose extremity 12 with a size and location arranged to align with and accommodate therethrough only the central latch finger 28 of the latch lever. The angular disposition of the blade 22 on the latch lever is such as to urge the latch lever into a normal position in which the latch finger 28 extends through the latch apperture 30. The latch fingers 26 and 27 not being accommodated through the latch aperture 30 limit the extreme position of the latch finger 28 as shown in FIG. 1, and the length of the latch finger 28 is sufficient to extend through the latch aperture and within the inside surface 13 of the hose extremity 12.

Referring to FIGS. 1 and 3, the butt portion 15 of each attachment 16 of which the butt portion is of small diameter so as to be accommodated in the inside surface 13 of the hose extremity, is formed with a plain rectangular aperture 40 of similar size and shape to the latch aperture 30 in the hose extremity.

The extremity of a small diameter butt portion of an attachment, when inserted into a hose extremity inside surface 13 will serve as a cam means cooperating with cam means provided by the inclined free extremity of the central latch finger 28 to cam the latch lever in a counterclockwise direction as shown in the drawings, upwardly into the latch aperture 30 in the hose extremity until the latch finger 28 comes into alignment with the aperture 40 in the attachment butt 15 at which time the resiliency in the blade element 22 will urge the latch finger 28 downwardly into securing relationship in the aperture 40 thus locking the attachment securely in place.

Referring to FIGS. 2 and 3, the butt 17 for each attachment 18 which is accommodated externally on the hose extremity 12 on the outside surface 14 thereof is formed differently. As shown in FIG. 3, each attachment butt 17 is formed with a slot 50 extending to the free extremity of the attachment butt 17. The slot 50 is as wide as the entire assembly of the latch fingers 26, 27 and 28. From each side of the slot 50 extend shallow ledges 51, the distance between the ledges 51 being substantially equal to the width of the central latch finger 28 with each ledge 51 being tapered toward the free extremity of the slot as indicated at 52. The ledges terminate short of the base of the slot 50 sufficiently to accommodate through the slot 50 adjacent the base thereof the entire assembly of latch fingers 26, 27 and 28, as shown in FIG. 3.

When an attachment with a large diameter butt 17 is inserted on the hose extremity 12 over the outer surface 14 thereof, the ledges 51 serve as interengaging cam means cooperating with the cam means provided by the inclined bottom edges of the latch fingers 26 and 27. The tapered ledge extremities 52 will engage beneath and cam upwardly the inclined bottom edges of the latch fingers 26 and 27 allowing the central latch finger to pass between the ledges 51 until the entire assembly of latch fingers passes the ledges 51 whereupon the latch fingers will drop behind the ledges, being urged to do so by the inclination of the blade 22 on the latch lever 20.

In order to release either an attachment 16 with a small diameter butt or an attachment 18 with a large diameter butt from latched relation on the hose extremity, the vacuum cleaner operator need only depress the latch lever beam extremity having the roughened surface 25 to withdraw the latch fingers from whichever latch aperture in which they may have been engaged so that the attachment may be removed from the hose extremity.

A wall 60 may be formed on the hand grip portion of the hose extremity to encircle and shroud the latch lever extremity within the roughened surface 25.

Accordingly, there has been disclosed an improved hose connection for vacuum cleaner attachments. It is understood that the above-described embodiment is merely illustrative of the application of the principles of this invention. Numerous other arrangements may be devised by those skilled in the art without departing from the spirit and scope of this invention, as defined by the appended claims.

We claim:

1. An attachment accommodating fitting for a vacuum cleaner air hose including an air hose extremity formed with an internal cylindrical surface and with an external cylindrical surface;
   said internal cylindrical surface adapted to accommodate therein a small diameter butt on an attachment, and said external cylindrical surface adapted to accommodate thereon a large diameter butt on an attachment;
   a latch lever pivotally supported on said air hose;
   first and second latch finger projections on one limb of said latch lever, each extending tangentially with respect to the pivotal support for said latch lever;
   said air hose extremity being formed with a latch finger accommodating aperture;
   resilient means biasing said latch lever toward a position in which one of said latch finger projections traverses said air hose extremity through said latch finger accommodating aperture;
   each small diameter attachment butt being formed with a latch aperture of size and shape corresponding to said first latch finger projection, and each large diameter attachment butt being formed with a latch aperture of size and shape corresponding to said second latch finger projection;
   interengaging cam means formed on each attachment butt and the latch finger projection with which said attachment butt latch aperture corresponds for retracting said latch finger projection in opposition to the bias of said resilient means during insertion of said attachment butt in place with respect to said hose extremity until alignment of said latch finger projection with said latch aperture in said attachment butt is attained;
   and operator influenced means for at-will retracting said latch finger projection to release an attachment for removal from said hose extremity.

2. An attachment accommodating fitting for a vacuum cleaner air hose as set forth in claim 1 in which:
   said latch lever is pivotally supported and arranged externally of said air hose;
   said latch finger accommodating aperture in said air hose extremity is of size and shape to accommodate passage therethrough of only said first latch finger projection and to block passage of said second latch finger projection.

3. An attachment accommodating fitting for a vacuum cleaner air hose as set forth in claim 2, in which said interengaging cam means includes an inclined cam follower surface formed on the free extremity of each of said latch finger projections; and actuating cam surfaces formed on each attachment butt for engaging said inclined cam follower surfaces to retract said latch fingers during insertion of said attachment butts into place.

4. An attachment accommodating fitting for a vacuum cleaner air hose as set forth in claim 3,
   in which said first latch finger projection comprises a block of uniform width extending from said latch lever;
   in which said second latch finger projection includes a pair of blocks, one at each side of said first latch finger projection, each extending from said latch lever a distance less than said first latch finger projection;
   and in which said latch aperture formed in each large diameter attachment butt comprises a slot open to the free extremity of said attachment butt, having a width equal to the combined width of said first and second latch finger projections;

and in which said interengaging cam means on each large diameter attachment butt includes ledges extending into said latch aperture slot from opposite sides of said slot, said ledges terminating a distance apart equal to the width of said first latch finger projection.

5. An attachment accommodating fitting for a vacuum cleaner air hose as set forth in claim 1
in which said air hose extremity is formed with a latch lever supporting aperture;
and in which said pivotal support for said latch lever, as well as said resilient means biasing said latch lever toward a position in which one of said latch finger projections traverses said air hose extremity is provided by a support blade formed integrally with said latch lever and extending in non-perpendicular relation therefrom inclined toward said latch finger projections; and clevises formed one at each side of said support blade equidistant from said latch lever for snugly embracing opposite sides of said latch lever supporting aperture in said air hose extremity.

6. An attachment accommodating fitting for a vacuum cleaner air hose as set forth in claim 5, in which said support blade extends from that limb of said latch lever carrying said latch finger projections at an angle of approximately 87 degrees.

* * * * *